US012293664B2

(12) United States Patent
Reaser

(10) Patent No.: US 12,293,664 B2
(45) Date of Patent: May 6, 2025

(54) PARKING MONITORING AND ASSISTANCE FOR TRANSPORTS

(71) Applicant: TOYOTA MOTOR NORTH AMERICA, INC., Plano, TX (US)

(72) Inventor: Daniel Warren Reaser, Oak Point, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 18/586,430

(22) Filed: Feb. 24, 2024

(65) Prior Publication Data

US 2024/0194070 A1 Jun. 13, 2024

Related U.S. Application Data

(63) Continuation of application No. 18/299,014, filed on Apr. 11, 2023, now Pat. No. 11,948,460, which is a continuation of application No. 17/171,261, filed on Feb. 9, 2021, now Pat. No. 11,626,019, which is a continuation of application No. 16/441,096, filed on Jun. 14, 2019, now Pat. No. 10,957,199.

(51) Int. Cl.
| | |
|---|---|
| *B60W 30/06* | (2006.01) |
| *G01C 21/36* | (2006.01) |
| *G06Q 10/02* | (2012.01) |
| *G06Q 50/40* | (2024.01) |
| *G08G 1/14* | (2006.01) |

(52) U.S. Cl.
CPC ............. *G08G 1/143* (2013.01); *B60W 30/06* (2013.01); *G01C 21/3617* (2013.01); *G06Q 10/02* (2013.01); *G06Q 50/40* (2024.01); *G06Q 2240/00* (2013.01)

(58) Field of Classification Search
CPC ............... B60W 30/06; G01C 21/3415; G01C 21/3617; G01C 21/3685; G06Q 10/02; G06Q 2240/00; G06Q 50/30; G08G 1/143; G08G 1/144
USPC ...................................................... 340/932.2
See application file for complete search history.

(56) References Cited

U.S. PATENT DOCUMENTS

| | | | |
|---|---|---|---|
| 3,141,612 | A | 7/1964 | Bolton |
| 6,317,720 | B1 | 11/2001 | Murakami et al. |
| 7,834,778 | B2 | 11/2010 | Browne et al. |
| 8,484,151 | B1 | 7/2013 | Lookingbill |
| 8,779,940 | B2 | 7/2014 | Amir |
| 9,135,821 | B2 | 9/2015 | Levy et al. |

(Continued)

FOREIGN PATENT DOCUMENTS

| | | |
|---|---|---|
| AU | 2014202297 B2 | 2/2018 |
| CN | 1558345 A | 12/2004 |

(Continued)

*Primary Examiner* — Naomi J Small

(57) ABSTRACT

An example operation may include one or more of parking a transport in an initial space, determining an average time of an event attended by at least one occupant associated with the transport, moving the transport to at least one other space when an elapsed time of the event is less than the average time and when the at least one other space is available and closer to an event location than the initial space, and moving the transport to a final space when the event is completed, and the final space is a location of a device associated with the at least one occupant.

20 Claims, 17 Drawing Sheets

(56) References Cited

U.S. PATENT DOCUMENTS

| | | | |
|---|---|---|---|
| 9,377,319 B2 | 6/2016 | Filippo et al. | |
| 9,449,512 B2 | 9/2016 | Zafiroglu et al. | |
| 9,581,997 B1 | 2/2017 | Penilla et al. | |
| 9,947,223 B2* | 4/2018 | Mielenz | G05D 1/0212 |
| 9,959,761 B2 | 5/2018 | Tsyrklevich | |
| 10,037,030 B2 | 7/2018 | Bostick et al. | |
| 10,127,563 B2 | 11/2018 | Heath | |
| 10,152,889 B2 | 12/2018 | Levy et al. | |
| 10,156,848 B1* | 12/2018 | Konrardy | B60P 3/12 |
| 10,299,216 B1 | 5/2019 | Wengreen et al. | |
| 2002/0019760 A1 | 2/2002 | Murakami et al. | |
| 2011/0063132 A1 | 3/2011 | Trum | |
| 2011/0082588 A1* | 4/2011 | McDowell, Jr. | E04H 6/225 414/256 |
| 2011/0133959 A1 | 6/2011 | Suzuki et al. | |
| 2012/0056758 A1 | 3/2012 | Kuhlman et al. | |
| 2012/0188100 A1 | 7/2012 | Min et al. | |
| 2014/0222252 A1* | 8/2014 | Matters | G05D 1/0016 701/2 |
| 2014/0350854 A1 | 11/2014 | Sugimoto et al. | |
| 2015/0149265 A1 | 5/2015 | Huntzicker et al. | |
| 2015/0279213 A1 | 10/2015 | Balter et al. | |
| 2015/0346727 A1* | 12/2015 | Ramanujam | B62D 15/0285 701/23 |
| 2016/0155276 A1 | 6/2016 | Ho et al. | |
| 2016/0189435 A1* | 6/2016 | Beaurepaire | G08G 1/202 705/13 |
| 2017/0178511 A1* | 6/2017 | Berns | G08G 1/144 |
| 2017/0253237 A1* | 9/2017 | Diessner | G05D 1/0221 |
| 2017/0329346 A1* | 11/2017 | Latotzki | G08G 1/202 |
| 2017/0372100 A1 | 12/2017 | Bhardwaj | |
| 2018/0001930 A1* | 1/2018 | Sham | G01S 15/86 |
| 2018/0121833 A1* | 5/2018 | Friedman | G01C 21/3453 |
| 2018/0151069 A1 | 5/2018 | Korman | |
| 2018/0174454 A1 | 6/2018 | Tiwaree et al. | |
| 2018/0268617 A1 | 9/2018 | Bruce et al. | |
| 2018/0286237 A1 | 10/2018 | Hu et al. | |
| 2018/0301031 A1 | 10/2018 | Naamani et al. | |
| 2018/0313660 A1 | 11/2018 | Eyster et al. | |
| 2019/0087877 A1 | 3/2019 | Tashiro | |
| 2019/0325522 A1 | 10/2019 | Bathia et al. | |
| 2020/0005642 A1 | 1/2020 | Kim | |
| 2020/0037125 A1 | 1/2020 | Neuert | |
| 2020/0134592 A1* | 4/2020 | Rao | G06Q 20/38215 |
| 2020/0193721 A1 | 6/2020 | Khim et al. | |
| 2020/0290640 A1* | 9/2020 | Schuller | B60W 30/06 |
| 2020/0311848 A1* | 10/2020 | Weldemariam | G06Q 20/3224 |
| 2021/0122360 A1* | 4/2021 | Okamura | B60W 30/06 |
| 2021/0180954 A1* | 6/2021 | Hiyokawa | G06V 20/586 |

FOREIGN PATENT DOCUMENTS

| | | |
|---|---|---|
| CN | 101472371 A | 7/2009 |
| CN | 104169990 A | 11/2014 |
| CN | 104871220 A | 8/2015 |
| CN | 104011506 B | 7/2017 |
| CN | 107067813 A | 8/2017 |
| CN | 104442807 B | 5/2018 |
| CN | 108986528 A | 12/2018 |
| CN | 109147382 A | 1/2019 |
| CN | 209132970 U | 7/2019 |
| CN | 111337038 A | 6/2020 |
| CN | 108335524 B | 9/2020 |
| DE | 102006016050 A1 | 10/2007 |
| DE | 102014209453 A1 | 11/2015 |
| EP | 2330580 A1 | 6/2011 |
| EP | 2849017 B1 | 4/2016 |
| EP | 3250443 B1 | 10/2018 |
| EP | 2869282 B1 | 1/2019 |
| JP | 2009187346 A | 8/2009 |
| JP | 2009211253 A | 9/2009 |
| JP | 2013135550 A | 7/2013 |
| JP | 2014041475 A | 3/2014 |
| JP | 2016151940 A | 8/2016 |
| JP | 6330509 B2 | 5/2018 |
| KR | 20120086140 A | 8/2012 |
| KR | 101182853 B1 | 9/2012 |
| KR | 20150038776 A | 4/2015 |
| KR | 101552500 B1 | 9/2015 |
| KR | 101711026 B1 | 3/2017 |
| KR | 20170025206 A | 3/2017 |
| KR | 20170041166 A | 4/2017 |
| WO | 2006109828 A1 | 10/2006 |
| WO | 2015169204 A1 | 11/2015 |
| WO | 2016148560 A1 | 9/2016 |

* cited by examiner

700

PARKING MONITORING AND ASSISTANCE FOR TRANSPORTS

CROSS-REFERENCE TO RELATED APPLICATIONS

This application is a continuation of U.S. patent application Ser. No. 18/299,014, filed on Apr. 11, 2023, which is a continuation of U.S. patent application Ser. No. 17/171,261, filed on Feb. 9, 2021, now U.S. Pat. No. 11,626,019, issued on Apr. 11, 2023, which is a continuation of U.S. patent application Ser. No. 16/441,096, filed on Jun. 14, 2019, now U.S. Pat. No. 10,957,199, issued on Mar. 23, 2023, the entire disclosures of which are incorporated by reference herein.

TECHNICAL FIELD

This application generally relates to automated parking assistance, and more particularly, to parking monitoring and assistance for transports.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

Parking transports has always required time to identify optimal parking spaces which are close to a particular venue of interest to the transport passengers. As congestion increases the ability to identify optimal parking spaces decreases.

Autonomous transports which are operated without drivers can make parking easier since the transport could drop the passengers off at one location and park in another location. However, the ability to coordinate such parking procedures requires various information regarding where the passengers are going, when they are finished, and what preferences and privileges are available to those utilizing the nearby parking spaces.

SUMMARY

One example embodiment may provide a method that includes one or more of parking a transport in an initial space, determining an average time of an event attended by at least one occupant associated with the transport, moving the transport to at least one other space when an elapsed time of the event is less than the average time and when the at least one other space is available and closer to an event location than the initial space, and moving the transport to a final space when the event is completed, and the final space is a location of a device associated with the at least one occupant.

Another example embodiment may include a system that includes a transport configured to be parked in an initial space, and a server configured to perform one or more of determine an average time of an event attended by at least one occupant associated with the transport, instruct the transport to move to at least one other space when an elapsed time of the event is less than the average time and when the at least one other space is available and closer to an event location than the initial space, and the transport moves to a final space when the event is completed, and the final space is a location of a device associated with the at least one occupant.

Yet another example embodiment may include a non-transitory computer readable storage medium configured to store instructions that when executed cause a processor to perform one or more of parking a transport in an initial space, determining an average time of an event attended by at least one occupant associated with the transport, moving the transport to at least one other space when an elapsed time of the event is less than the average time and when the at least one other space is available and closer to an event location than the initial space, and moving the transport to a final space when the event is completed, wherein the final space is a location of a device associated with the at least one occupant.

Yet a further example embodiment may include a method that includes one or more of identifying a plurality of transports with an assigned destination location, determining the plurality of transports assigned to the destination location exceeds a number of available parking spaces at the destination location, identifying alternative parking spaces in an area adjacent to the destination location, and assigning at least one of the alternative parking spaces to at least one of the plurality of transports based on a priority of the at least one transport.

Yet a further example embodiment may include a system that includes a plurality of transports, and a server configured to perform one or more of identify the plurality of transports with an assigned destination location, determine the plurality of transports assigned to the destination location exceeds a number of available parking spaces at the destination location, identify alternative parking spaces in an area adjacent to the destination location, and assign at least one of the alternative parking spaces to at least one of the plurality of transports based on a priority of the at least one transport.

Still another example embodiment may include a non-transitory computer readable storage medium configured to store instructions that when executed cause a processor to perform one or more of identifying a plurality of transports with an assigned destination location, determining the plurality of transports assigned to the destination location exceeds a number of available parking spaces at the destination location, identifying alternative parking spaces in an area adjacent to the destination location, and assigning at least one of the alternative parking spaces to at least one of the plurality of transports based on a priority of the at least one transport.

DETAILED DESCRIPTION

Figure 1A:
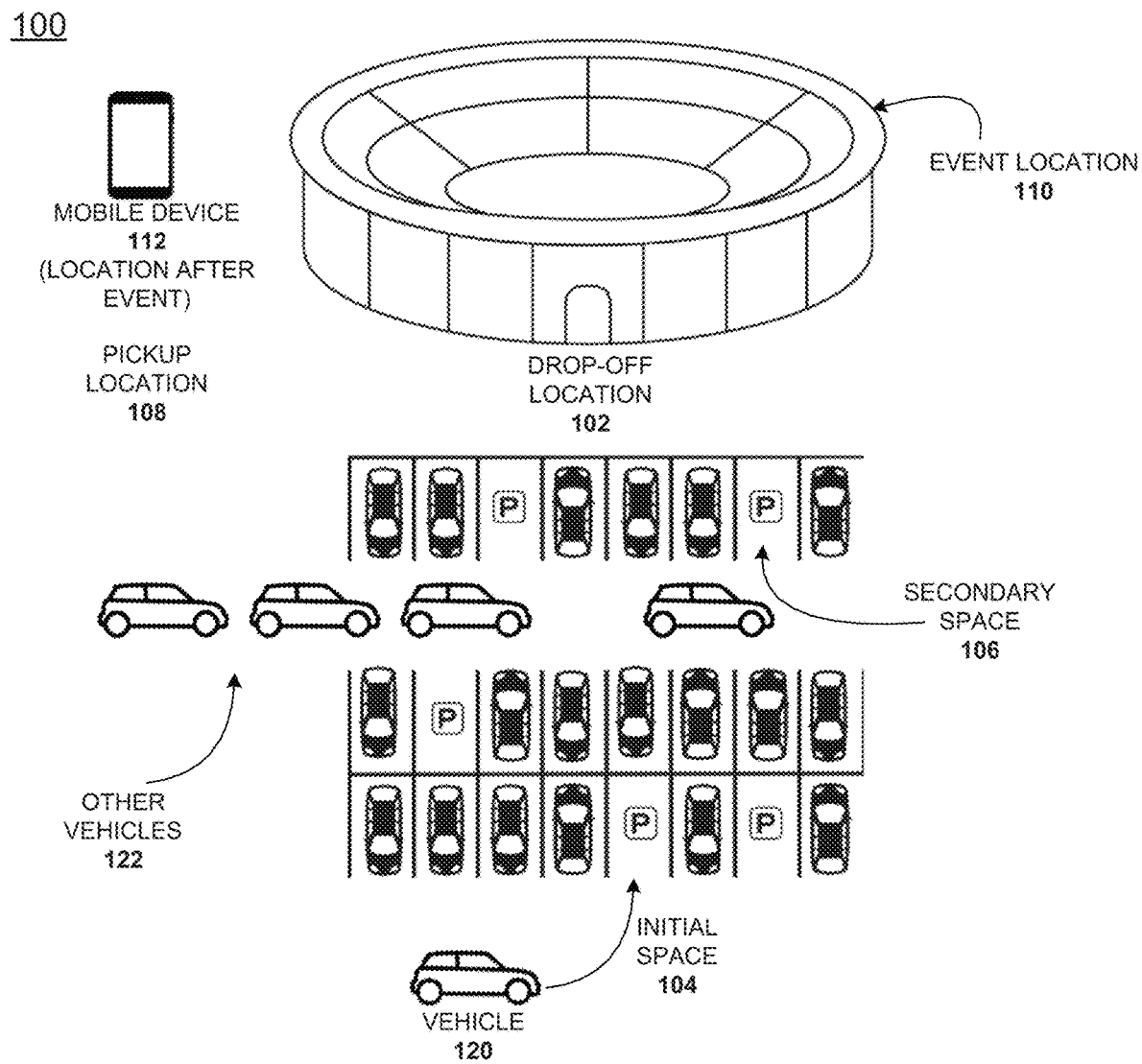
FIG. 1A illustrates an example network diagram of a transport traveling to a destination and engaging in a parking and pick-up scenario, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services. In another example, the user profile may be used to identify a user priority status when operating/riding in a vehicle. The priority may provide a way to assign parking spaces to a particular vehicle.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle parking service to a particular vehicle and/or a requesting user associated with a user profile that is applied to the vehicle. For example, a user may be the owner of a vehicle or the operator of a vehicle owned by another party. The vehicle may require parking services at certain intervals and the parking service needs may require authorization prior to permitting the parking services to be received. The vehicle paring service needs may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates a network diagram of a transport parking configuration according to example embodiments. Referring to FIG. 1A, the configuration 100 includes an event location 100, such as concert hall, stadium, restaurant, airport, etc. The transports/vehicles (such terms are used interchangeably throughout the specification), may be near a particular location 110, such as within a threshold distance (Td) of the location 110 and near a parking area defined by a plurality of parking spaces. The various vehicles 122 may include, for example, a target vehicle 120 that is attempting to receive access to the parking spaces. The application operated by an on-board computer of the vehicle 120, the user's mobile device 112 and/or a remote server, may identify an estimated number of transports/vehicles 122 near the parking area, such as within a threshold distance of the parking area. At some point in time, the premier parking or closer parking may become occupied. The vehicle of interest 120 may be assigned a different space 104 as an initial space depending on the priority assigned to that vehicle 120. In another example, the initial space 104 may be identified by the parking management application since there are too many vehicles 122 in an area where there are too many spaces at a current time (T0). In this example, the vehicle 120 may be instructed to perform a drop-off at an optimal drop-off location point 102 near the entrance to the event location 110. Next, the vehicle 120 may be instructed to park itself without any occupants inside. The parking effort may include avoiding the busier locations near the entrance where the majority of other vehicles are currently located and instead find a parking space 104 in a further away location. At a later time (T1), and prior to the event conclusion time (Tc) (e.g., 2 hours, etc.), the vehicle 120 may attempt to relocate closer to the event location when additional spaces become available. For example, in any event, there are usually a number of spaces that will become vacant prior to the event conclusion time due to attendees needing to leave early before the end of the event. At the later time (T1), the vehicle 120 may attempt to park in closer space 106 to optimize the process of picking-up the occupants at the event conclusion. The secondary space 106 may have been previously unavailable at time T0, however, it may have become available at time T1. The vehicle 120 may then relocate and continue waiting until an end of event notification is received, or the time Tc has matured.

Event venues often have various different entrances and exits in one example the occupants may be identified via their user device(s) 112 entering one location and exiting via another location. In this example, the vehicle may set a location range on the mobile device of the vehicle 120 occupant. Once the occupant performs an end of event activity, such as executing a transaction, moving outside the event area location, etc., the vehicle may begin to track the mobile device location 112 and identify whether it is moving outside the event location 110. The pickup location 108 may be assigned by the vehicle and/or the user's mobile device 112. The other vehicles may be assigned parking spaces or may identify, on their own, certain available parking spaces. Also, once the event status is identified as completed, such as when the time (Tc) has matured, the mobile device location may be identified and used to create a pickup location where the vehicle may autonomously move towards. One example may include the mobile device moving towards a pickup area and not moving for a threshold period of time at the pickup area (Tpa), then the vehicle 120 can identify that as the pickup location 108.

Figure 1B:
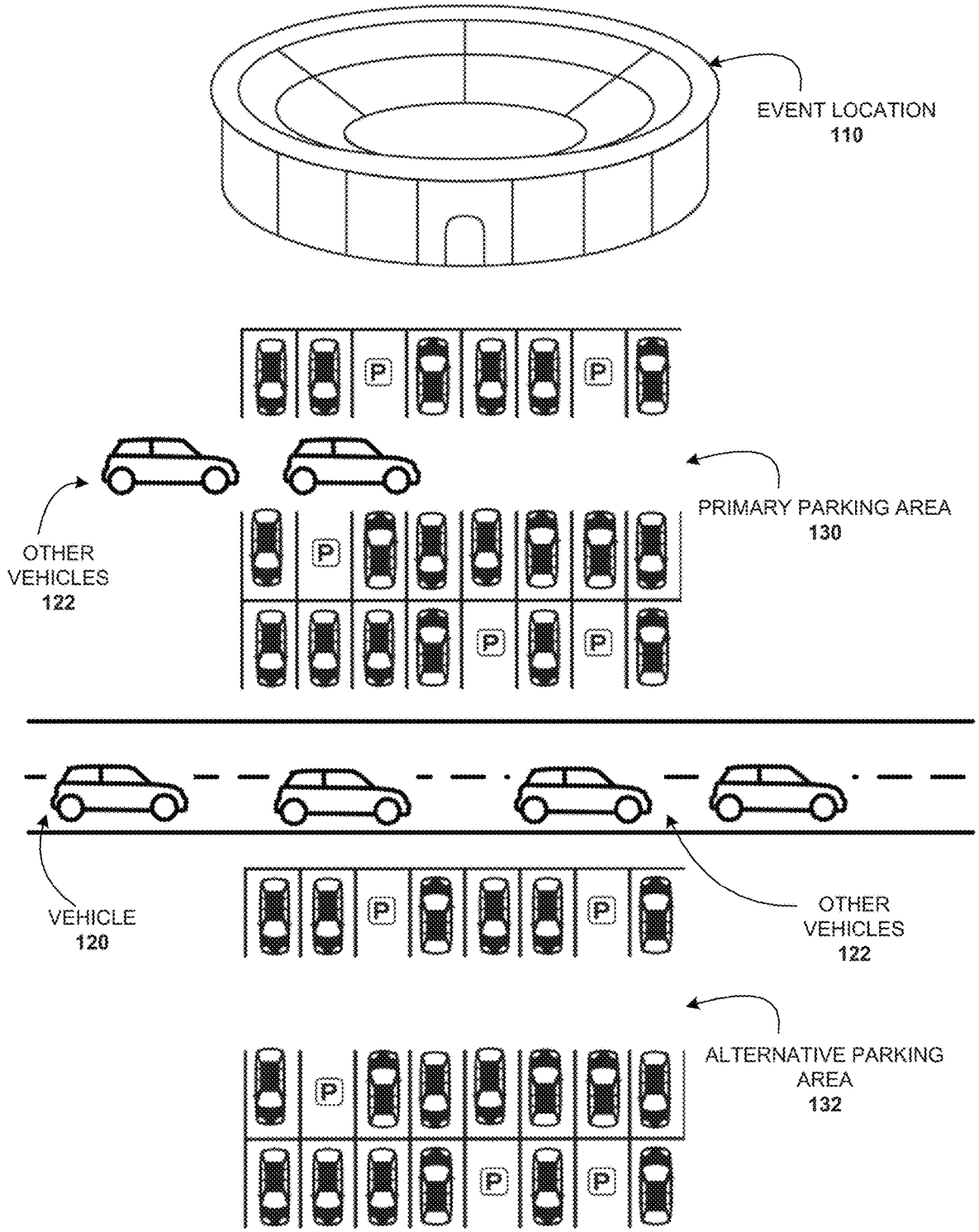
FIG. 1B illustrates another example network diagram of a transport traveling to a destination and engaging in a parking scenario, according to example embodiments.

FIG. 1B illustrates another example configuration of a transport parking assignment scenario according to example embodiments. Referring to FIG. 1B, the example configuration 150 provides a scenario where there are multiple vehicles 122 attempting to arrive at a particular event venue 110. The remote management server, such as an off-site server in constant communication with one or more vehicles may identify a threshold number of vehicles which are attempting to travel to the event location 110. The number of identified vehicles with known destinations designated as the event location 110 may exceed a number of known parking spaces. The number of vehicles may be counted and tracked prior to the event. The determination that the event parking, such as primary parking 130, has been exceeded by the number of vehicles 122 navigating to the event location 110, may invoke suggested and/or assigned parking to the vehicle of interest 120 in an alternative parking area 132 which is further away from the location of the event location 110. Assuming there is a limited amount of primary parking 130 available, the priority assigned to the vehicle profiles may be identified, such as priority A, B, C, etc., depending on a subscription or prearranged condition stored in the vehicle profiles. For example, some of the vehicle profiles may have invoked a priority arrangement prior to the event time or may have accepted a compensation agreement that is invoked by a smart contract and recorded as a blockchain transaction. The vehicles without executed prioritized parking agreements, are assigned a lower priority and will be instructed to drive to the alternative parking area 132.

After a period of time, but before the end of the event at the event location 110, the vehicles located in the alternative parking 132 may be permitted to relocate to the primary parking area 130. The time may be after half of the event time has lapsed or a majority of the event time (e.g., 2, 3 hours, etc.) has lapsed, in one example. The vehicles in the alternative parking area 132 may autonomously repark in the primary parking area 130 after such a time has lapsed. The vehicle destination location identification process may include tracking various subscribed vehicle profiles for destination information. The vehicles in route on a roadway may be identified as having a destination that matches the event location 110. Once the number of vehicles exceeds the amount of available primary parking area parking 130 and/or a number of priority parking profiles associated with the vehicles have been assigned to the primary parking area 130, the reassignment process of instructing the remaining vehicles and low priority vehicles to the alternative parking area 132 may be invoked to accommodate optimal parking arrangements.

Figure 1C:
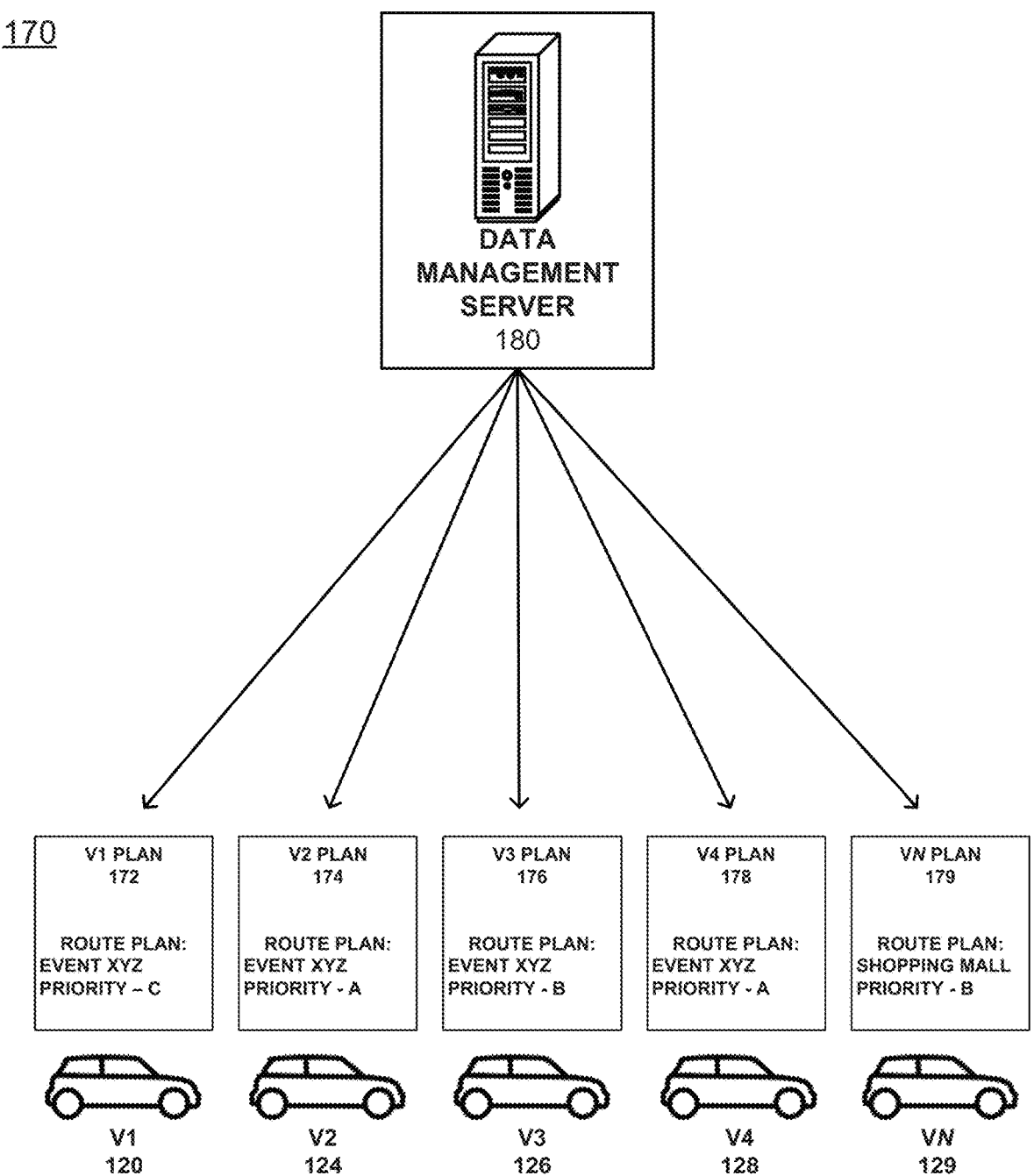
FIG. 1C illustrates an example of a management server monitoring transport routes and destinations, according to example embodiments.

FIG. 1C illustrates an example of a management server monitoring transport routes and destinations, according to example embodiments. Referring to FIG. 1C, in this configuration 170, the data management server 180 tracks the vehicle route plans of various vehicles V1, V2 . . . VN. Each of the vehicles may share a respective travel plan 172-179 with the server by a pre-authorization, permitting the vehicle to be tracked and monitored. The destination set for the navigation functions operated by the vehicle computing device and/or the occupant mobile device(s) may be used as a route plan monitoring feature. In this example, V2 124 and V4 128 may have higher priority than V1 120 and V3 126 when attempting to travel to the event destination. The last vehicle VN 129 may be traveling to a different destination, such as a shopping mall and may not be included in the parking assignment configuration.

Figure 2A:
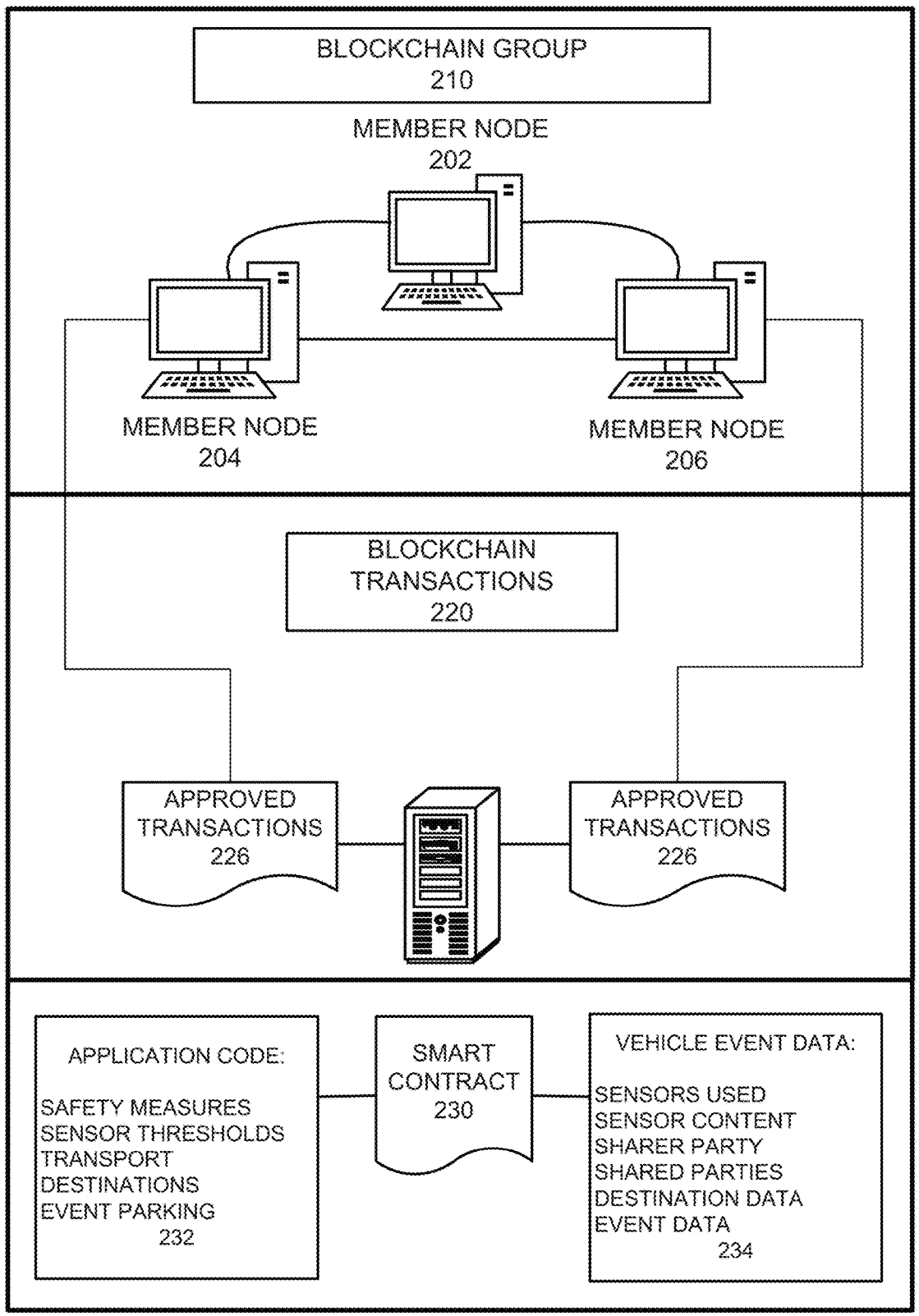
FIG. 2A illustrates a blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 234, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 230, which are then stored in a blockchain. For example, sensor thresholds stored in the smart contract can be used as the basis for whether a detected service is necessary and when and where the service should be performed.

Figure 2B:
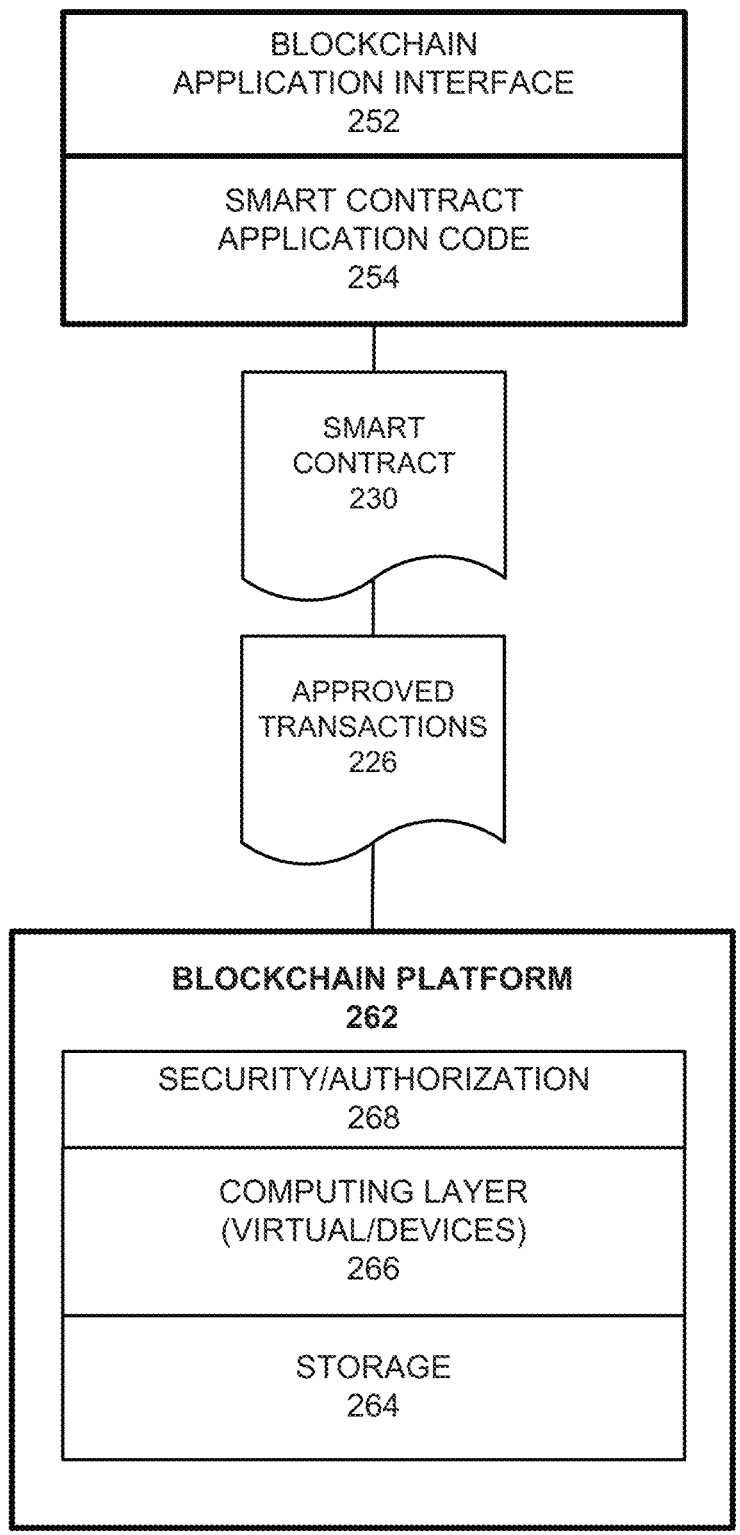
FIG. 2B illustrates another blockchain configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features.

As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 2C:
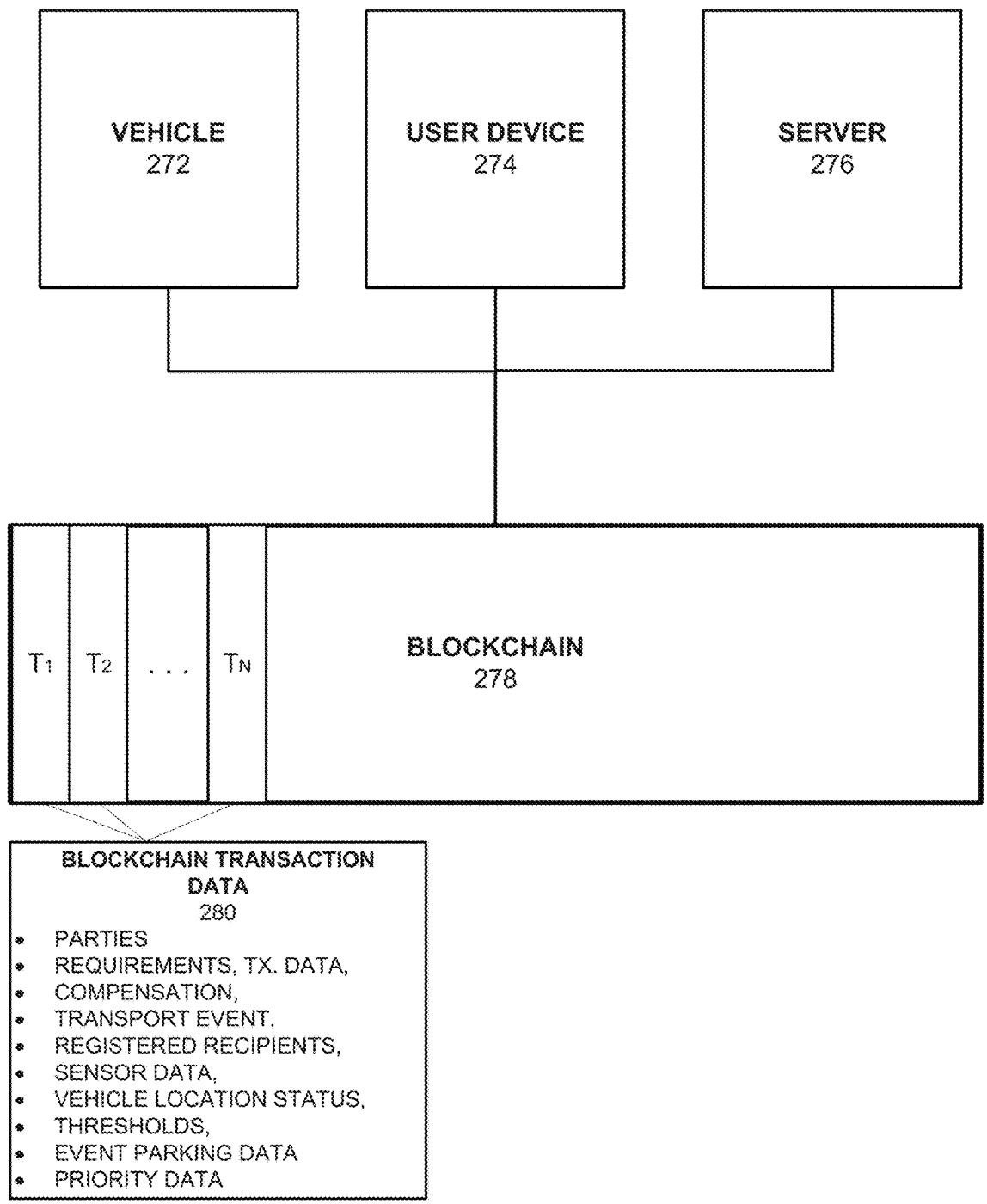
FIG. 2C illustrates a blockchain configuration for storing blockchain transaction data, according to example embodiments.

FIG. 2C illustrates a blockchain configuration for storing blockchain transaction data, according to example embodiments. Referring to FIG. 2C, the example configuration 270 provides for the vehicle 272, the user device 274 and a server 276 sharing information with a distributed ledger (i.e., blockchain) 278. The server may represent a service provider entity inquiring with a vehicle service provider to share user profile rating information in the event that a known and established user profile is attempting to rent a vehicle with an established rated profile. The server 276 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 280 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed. Also, in other examples, the transaction data may indicate the event parking data, such as available parking and priority data, such as whether certain vehicle profiles are registered to receive priority parking.

Figure 3A:
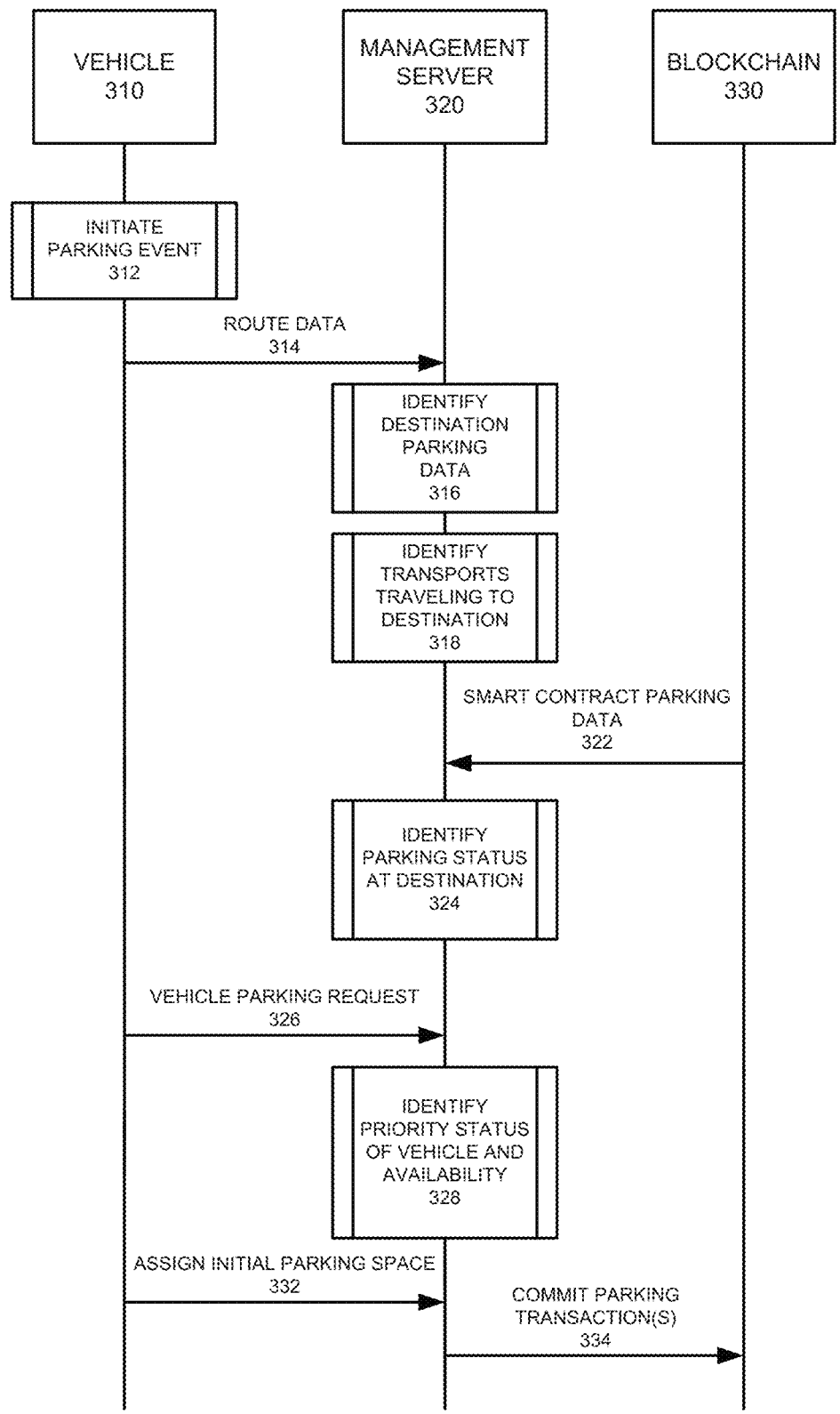
FIG. 3A illustrates a system messaging diagram of a parking management configuration, according to example embodiments.

FIG. 3A illustrates a vehicle parking and management system configuration, according to example embodiments. Referring to FIG. 3A, the system 300 provides a vehicle 310, such as one of many vehicles attempting to obtain parking access prior to an event. The vehicle may approach an event venue location and initiate a parking event 312 by approaching an event location and/or by requesting access to certain parking spaces. The management server 320 may identify route data 314 of a vehicle and identify parking spaces at the destination area 316. Also, the other vehicles/transports near or in route to the destination 318 may also be taken into consideration to assign the parking accordingly to those that arrive first and/or those that have a higher assigned priority. When a parking space is assigned, a smart contract may be invoked 322 to record the space as being assigned, any value assigned to the space, a date and time and the parties to the assignment. The status at the destination may be identified 324 to arrange for space assignments. A vehicle may request a space or area 326 ahead of arriving, and any priority status 328 may also be taken into consideration depending on the availability and the status of the vehicle profile. A space may be assigned as an initial space 332 where the vehicle is supposed to park. Any assignment or other transaction data may be committed 334 to a blockchain 330 for accurate record keeping purposes.

Figure 3B:
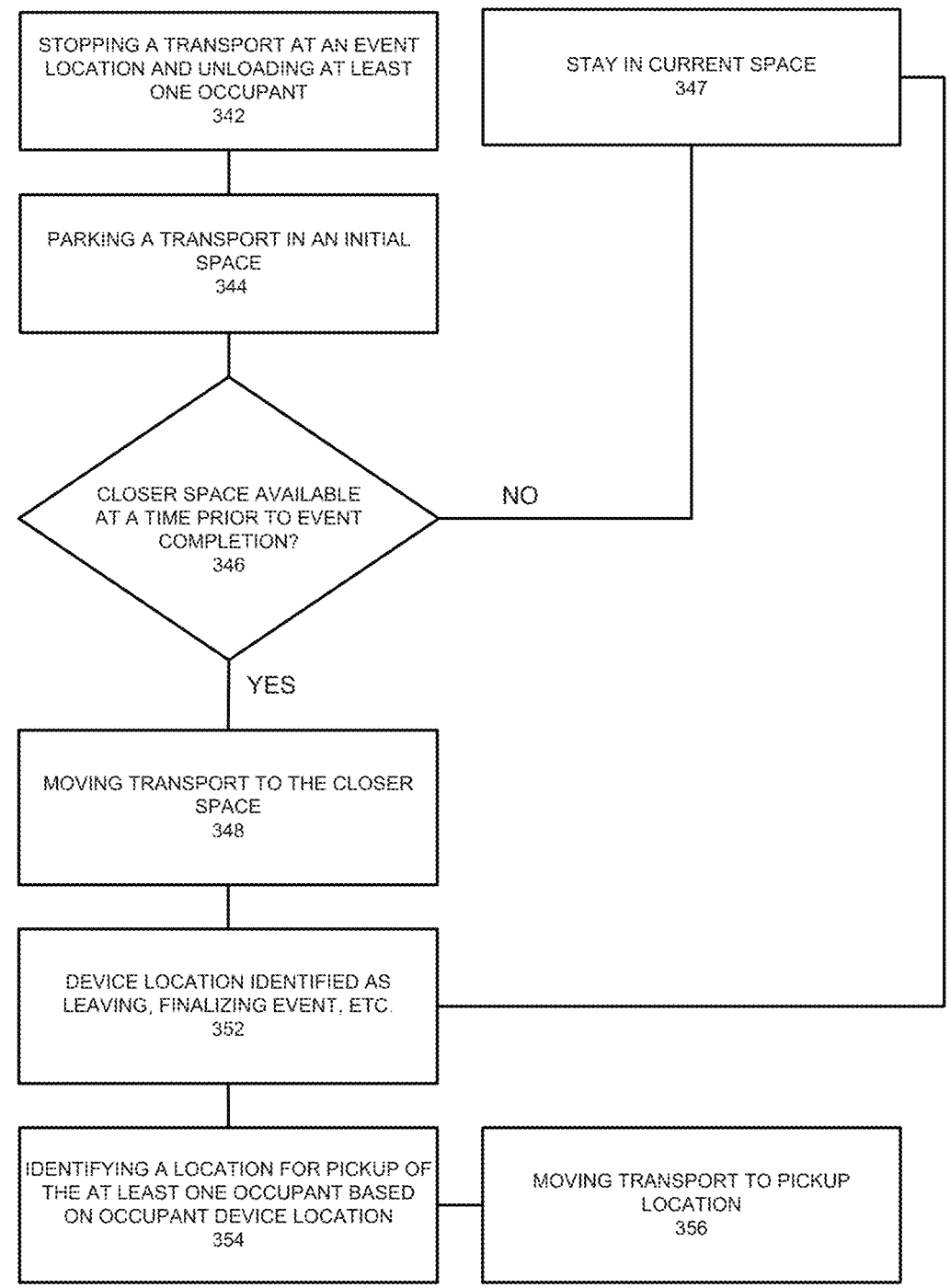
FIG. 3B illustrates a flow diagram of a parking management configuration, according to example embodiments.

FIG. 3B illustrates a parking assignment system configuration, according to example embodiments. Referring to FIG. 3B, the system 340 provides a scenario where a vehicle is approaching an event area for the purpose of obtaining parking and permitting an occupant(s) to be dropped-off near the event. The process provides stopping the transport at an event location, such as near an entrance location and unloading one or more occupants 342. The decision to drop-off prior to autonomously parking the transport may be based on a function of distance as to where the vehicle is expected to park. For example, dropping-off at an entrance, although convenient for the occupants, may still require experiencing traffic and time, and thus if the vehicle can obtain parking near the entrance it may be optimal to park first prior to the occupants unloading since the drop-off process may require a certain amount of time. As a result, the drop-off decision may be based on the vehicle not having priority parking near the entrance and instead the vehicle may have identified parking at a location that is beyond a threshold distance from the entrance, such as greater than 250 yards.

In this example, once the drop-off event occurs, the vehicle may move towards a parking space 344 that is beyond the threshold distance, such as in an alternative parking area further away from the event location. Then, at a later time, prior to the event being finished but after a minimum period of time, the vehicle may attempt to re-park in a space that is closer to the event entrance for the convenience of the occupants, if the space becomes available 346. However, a space must be identified as being available via a management server record that is referenced by the vehicle such as an aerial view of the parking, a notification that parking is available, a queue that identifies which vehicle is permitted to repark and an acceptance from the vehicle that such an opportunity is being taken. If the new space is accepted, the vehicle may have a set period of time to repark prior to the availability of the closer space expiring. If the space does not come available, the vehicle may stay in the current space 347. If the space is available, then the vehicle may move towards the new space 348. Once the user device location is identified as leaving or finalizing at an event, such as checking out of the event, then the vehicle may identify the occupant as needing access to the vehicle 352 and may attempt to move out of its current assigned space to identify a location for pickup 354. The user device location may be tracked to identify which exit the occupant is leaving from and what direction they are headed. The vehicle may move towards a roadway that is near that location for pickup 356.

Figure 3C:
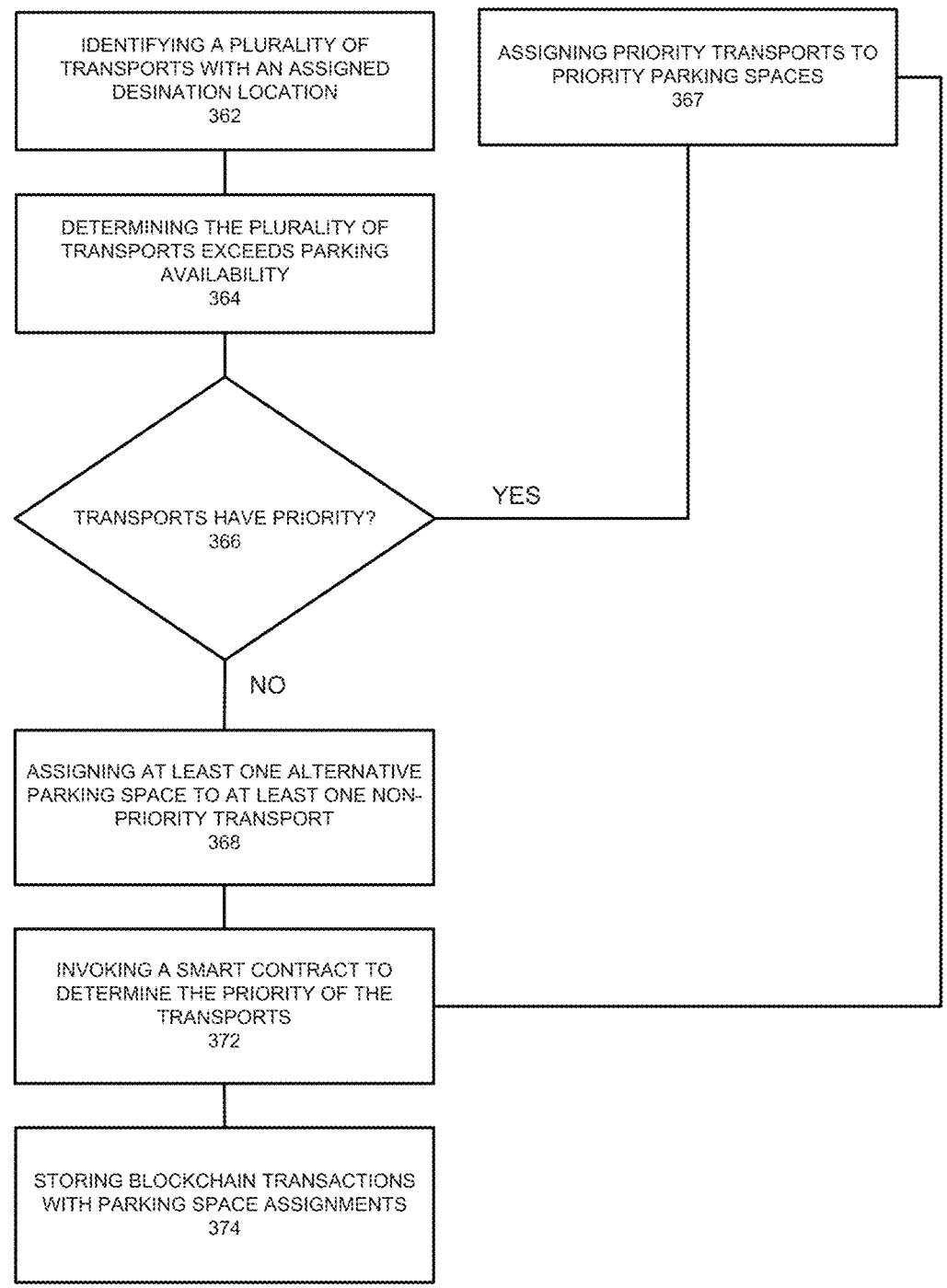
FIG. 3C illustrates another flow diagram of a parking management configuration, according to example embodiments.

FIG. 3C illustrates another parking management system configuration, according to example embodiments. Referring to FIG. 3C, the system 360 provides a scenario where vehicles are identified as attempting to travel to a destination, such as an event. The process provides identifying multiple transports with a same or similar destination 362, such as a location that would share parking (e.g., concert venue, sports arena, shopping mall, etc.). The process also provides determining the transports exceeds the current available parking at the destination 364. Also, the determination may include predicting the number of vehicles which will be at the event location based on known destinations of the transports on the road and/or in user profile calendars. Once the number of vehicles traveling to the event are known, the vehicle profiles may be retrieved to identify whether any have a priority status 366, have elected to have a priority status or are being awarded a priority status for various reasons, such as early arrival, elderly, special needs, etc. When the priority determination is made, the vehicles with priority will receive a priority assignment space 367, however, many vehicles may not qualify for priority parking and must be assigned to an alternative parking area 368, which is likely further away from the event entrance. A smart contract may be invoked 372 to determine the priority and assign parking spaces to the transports including the transport of interest in this example. As the terms of the contract are satisfied, the transaction may be completed by having the agreement finalized and stored in a blockchain transaction 374 in a distributed ledger.

Figure 4A:
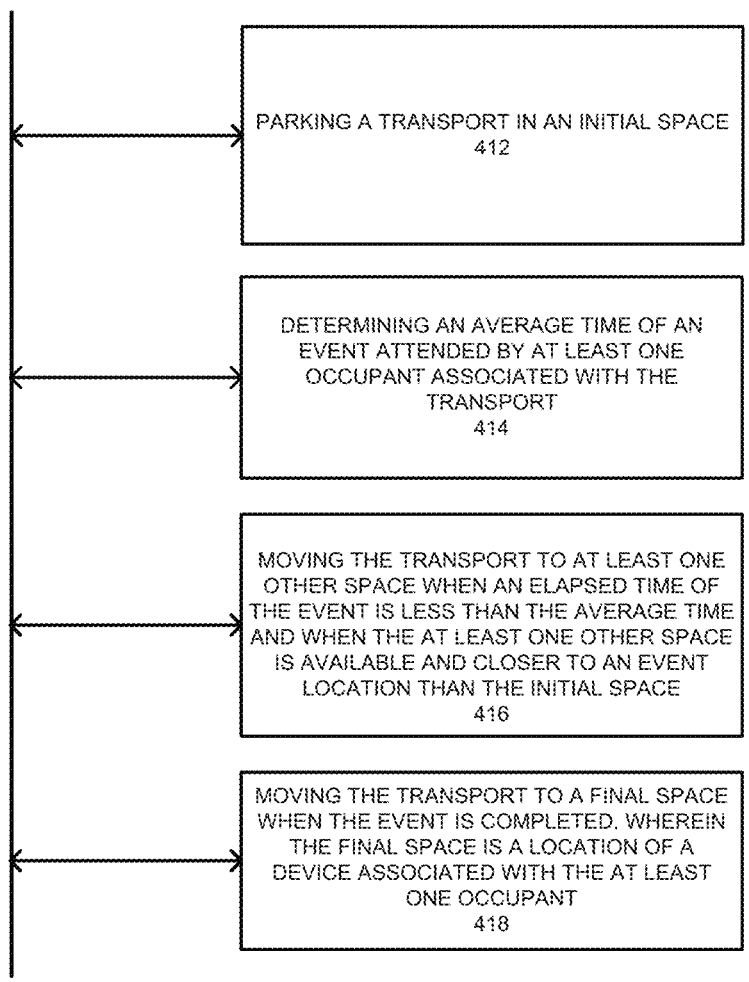
FIG. 4A illustrates a flow diagram of a parking management configuration, according to example embodiments.

FIG. 4A illustrates a flow diagram 400, according to example embodiments. Referring to FIG. 4A, the process provides parking a transport in an initial space 412, determining an average time of an event attended by at least one occupant associated with the transport 414, the average time may be an estimated completion time. The process may include moving the transport to at least one other space when an elapsed time of the event is less than the average time and when the at least one other space is available and closer to an event location than the initial space 416, and moving the transport to a final space when the event is completed, wherein the final space is a location of a device associated with the at least one occupant 418.

The process may also include stopping the transport at the event location and unloading the at least one occupant, moving the transport to the final space when an indication is received from the device, and the indication is at least one of a payment being made by the device, a location of the device, an exit event notification detected by the device. The process also includes notifying the device of a location of the initial space, the at least one other space and the final space. The process further includes determining a current availability of parking spaces for the event at a current time and prior to arriving at the event, when a shortage of the parking spaces are identified at the current time, determining a location to drop-off the at least one occupant prior to parking the transport, and the location to drop-off has a current optimal traffic movement pattern, and moving the transport to the location to drop-off, identifying a currently available transport parking space as the initial space, and moving the transport to the initial space. The process also includes invoking a smart contract responsive to identifying the currently available transport parking space, and the smart contract is used to assign the currently available parking space to the transport, responsive to assigning the currently available parking space to the transport, creating a blockchain transaction that identifies the date, the transport, the value of the currently available parking space and the at least one occupant.

Figure 4B:
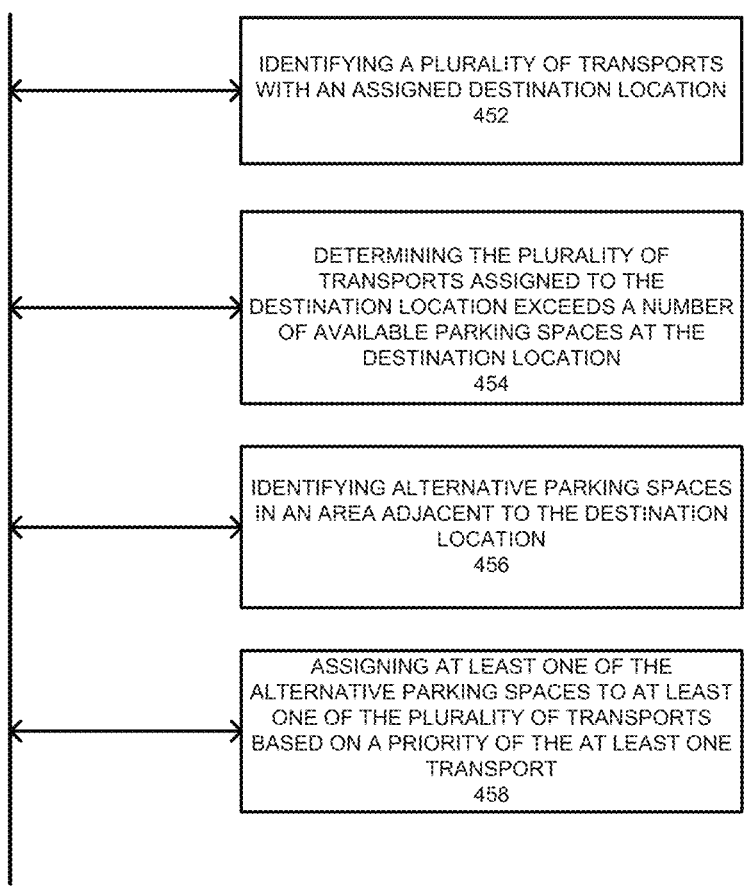
FIG. 4B illustrates another flow diagram of a parking management configuration, according to example embodiments.

FIG. 4B illustrates another flow diagram 450, according to example embodiments. Referring to FIG. 4B, the process includes identifying a plurality of transports with an assigned destination location 452, determining the plurality of transports assigned to the destination location exceeds a number of available parking spaces at the destination location 454, identifying alternative parking spaces in an area adjacent to the destination location 456, and assigning at least one of the alternative parking spaces to at least one of the plurality of transports based on a priority of the at least one transport 458. The process also includes identifying the plurality of transports are assigned to the destination location is performed when one or more of the plurality of transports are traveling towards the destination location and prior to a start time of an event at the destination location. The process also includes determining the priority of the at least one transport based on a previously assigned subscription status. The distance between the alternative parking space and the destination location is a function of the priority of the at least one transport. The process also includes moving the at least one transport to the destination location, unloading one or more occupants from the at least one transport, and moving the at least one transport to the assigned alternative parking space. The process further includes invoking a smart contract stored in a distributed ledger, and responsive to invoking the smart contract, determining the priority of the at least one transport, creating a blockchain transaction identifying the at least one transport, the date, and an amount of compensation for the assigned alternative parking space, and storing the blockchain transaction in the distributed ledger.

Figure 4C:
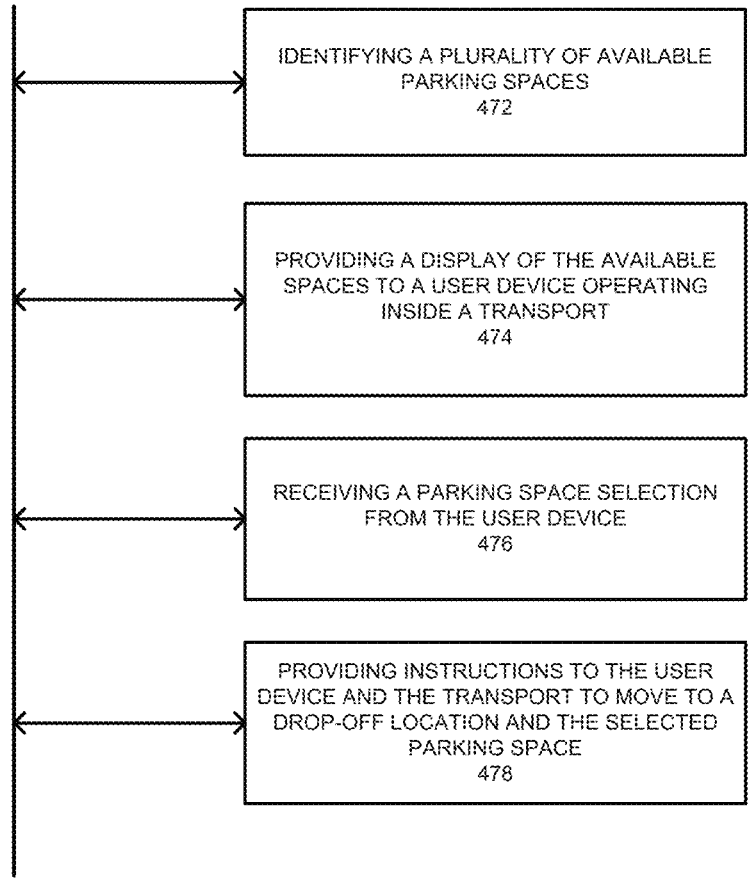
FIG. 4C illustrates yet another flow diagram of a parking management configuration, according to example embodiments.

FIG. 4C illustrates yet another flow diagram 470, according to example embodiments. Referring to FIG. 4C, the process includes identifying a plurality of available spaces 472, providing a display of the available spaces to a user device operating in the transport 474 to provide the user with a chance to select a parking space of interest. The user may make a selection based on the interface display options 476 and the application may respond by offering instructions on how to navigate to the space 478. This example provides a way to engage the user with options, some of which may include costs while some others may not. The user may accept or reject options and provide feedback about where the vehicle should be parked.

Figure 5A:
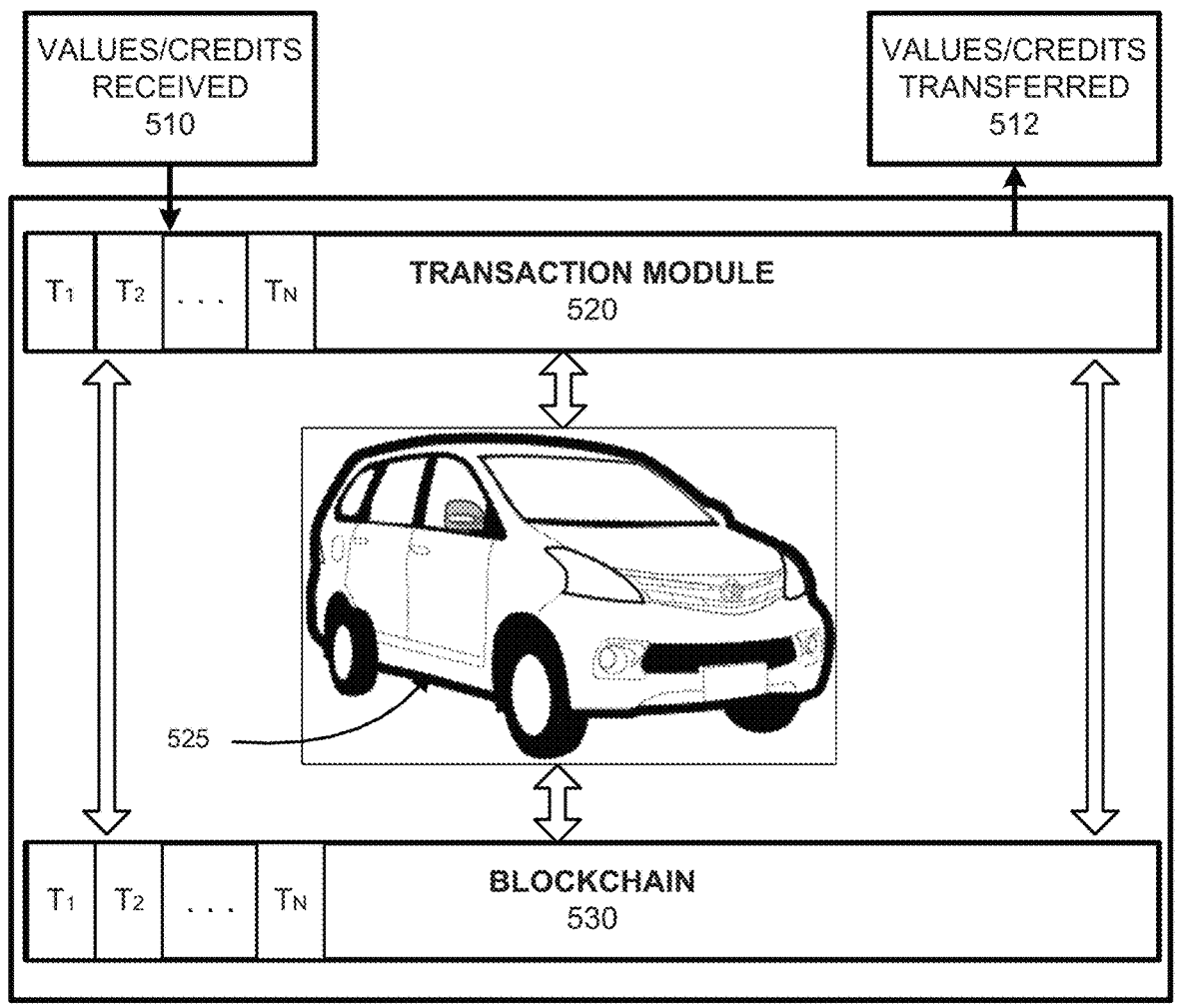
FIG. 5A illustrates an example blockchain vehicle configuration for managing blockchain transactions associated with a vehicle, according to example embodiments.

FIG. 5A illustrates an example blockchain vehicle configuration 500 for managing blockchain transactions associated with a vehicle, according to example embodiments. Referring to FIG. 5A, as a particular transport/vehicle 525 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 525. The values/credits received and/or transferred can be based on parking reservations as described herein. For example, as the vehicle approaches a venue and needs to secure a parking space, the values provided for a priority parking space may be deducted from their account. However, in some instances, a value may be provided to a vehicle for parking in a non-priority space even if the vehicle was present prior to other vehicles.

Figure 5B:
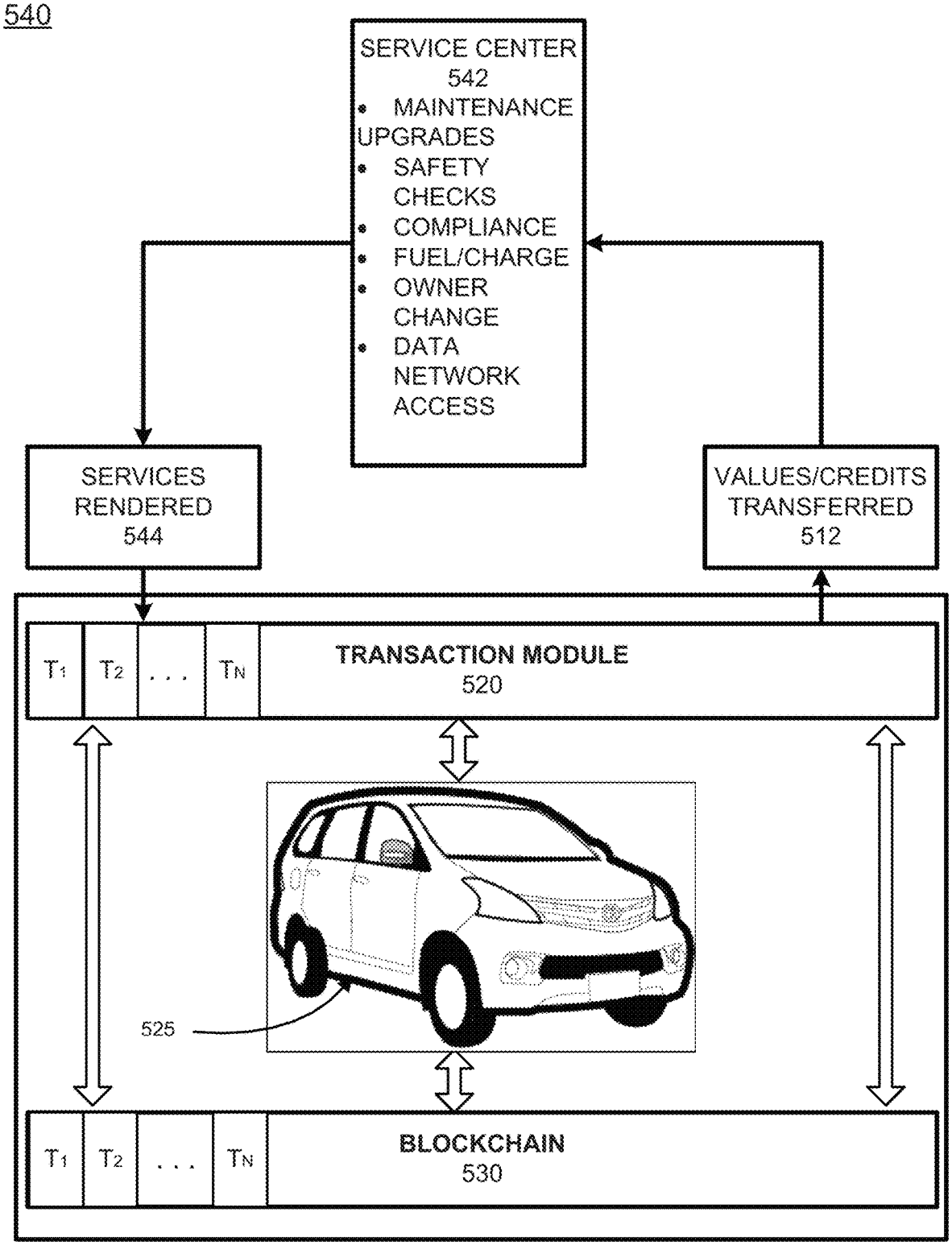
FIG. 5B illustrates another example blockchain vehicle configuration for managing blockchain transactions between a service center and a vehicle, according to example embodiments.

FIG. 5B illustrates an example blockchain vehicle configuration 540 for managing blockchain transactions between a service center and a vehicle, according to example embodiments. In this example, the vehicle 525 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge or replacement, tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 525 and/or the service center 542. In one example, a transport event may require a refuel or other vehicle service and the occupants may then be responsible for the responsibility value increase for such service. The service may be rendered via a blockchain notification which is then used to redistribute the responsibility value to the occupants via their respective responsibility values. Responsibility for the service center activities can be based on services performed in response to parking the vehicles in a particular space as described herein.

Figure 5C:
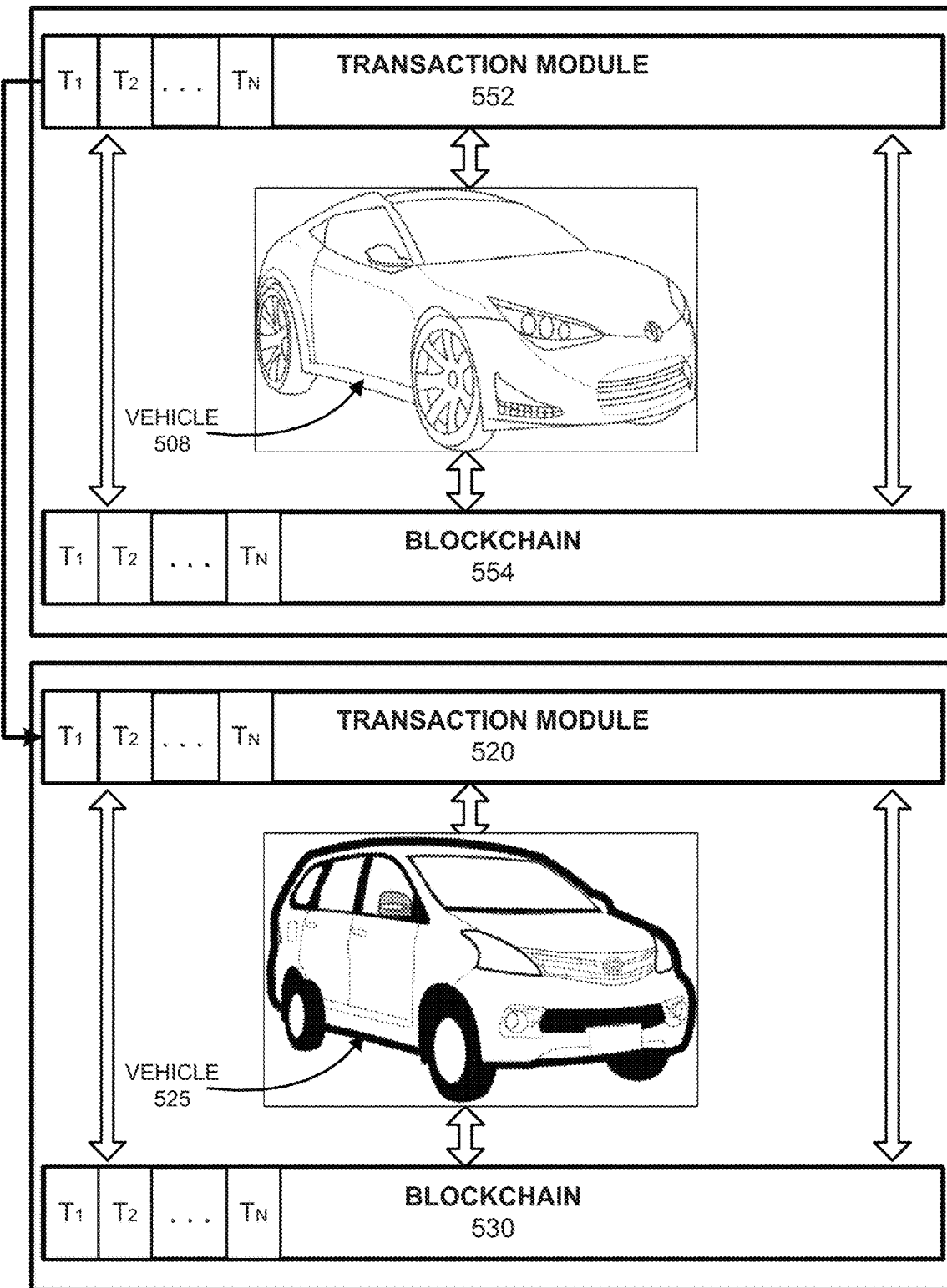
FIG. 5C illustrates yet another example blockchain vehicle configuration for managing blockchain transactions conducted among various vehicles, according to example embodiments

FIG. 5C illustrates an example blockchain vehicle configuration 550 for managing blockchain transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 525 which is in its network and which operates on its blockchain member service. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the blockchain 530/554 assuming that the blockchains are different from one another, or, are logged in the same blockchain used by all members. Responsibility for the transferred credits can be based on services shared between vehicles when parking the vehicles as described herein.

Figure 6:
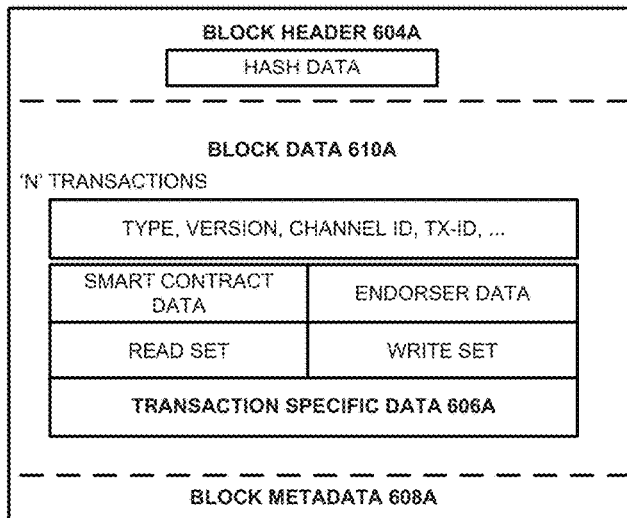
FIG. 6 illustrates example data blocks, according to example embodiments.
Figure 6:
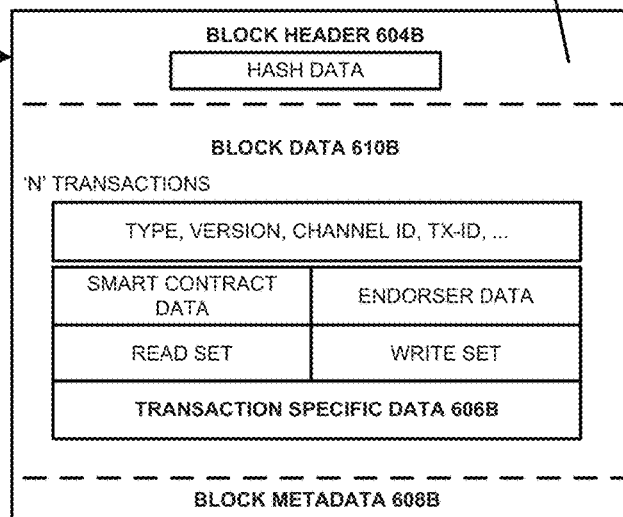
Figure 6:
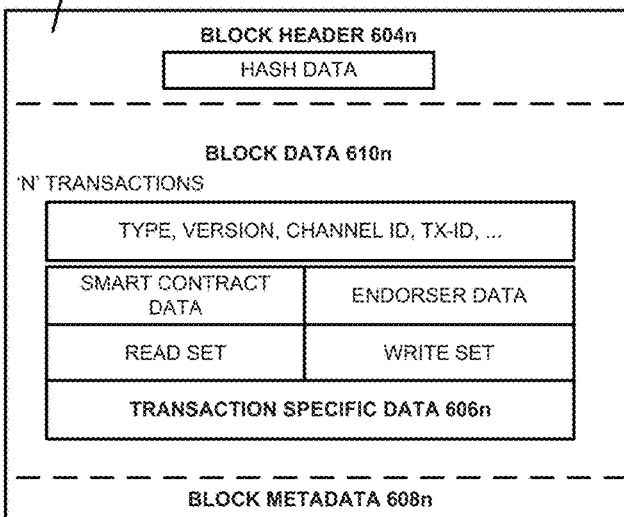

FIG. 6 illustrates blockchain blocks 600 that can be added to a distributed ledger, according to example embodiments, and contents of block structures 602A to 602n. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 602A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 602A (also referred to as a data block) that is stored on the blockchain and/or the distributed ledger may include multiple data segments such as a block header 604A to 604n, transaction specific data 606A to 606n, and block metadata 608A to 608n. It should be appreciated that the various depicted blocks and their contents, such as block 602A and its contents are merely for purposes of an example and are not meant to limit the scope of the example embodiments. In some cases, both the block header 604A and the block metadata 608A may be smaller than the transaction specific data 606A which stores entry data; however, this is not a requirement. The block 602A may store transactional information of N entries (e.g., 100, 500, 1000, 2000, 3000, etc.) within the block data 610A to 610n. The block 602A may also include a link to a previous block (e.g., on the blockchain) within the block header 604A. In particular, the block header 604A may include a hash of a previous block's header. The block header 604A may also include a unique block number, a hash of the block data 610A of the current block 602A, and the like. The block number of the block 602A may be unique and assigned in an incremental/sequential order starting from zero. The first block in the blockchain may be referred to as a genesis block which includes information about the blockchain, its members, the data stored therein, etc.

The block data 610A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 610A may also store transaction specific data 606A which adds additional information to the hash-linked chain of blocks in the blockchain. Accordingly, the data 606A can be stored in an immutable log of blocks on the distributed ledger. Some of the benefits of storing such data 606A are reflected in the various embodiments disclosed and depicted herein. The block metadata 608A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 602B to 602n in the blockchain also have headers, files, and values. However, unlike the first block 602A, each of the headers 604A to 604n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 612, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
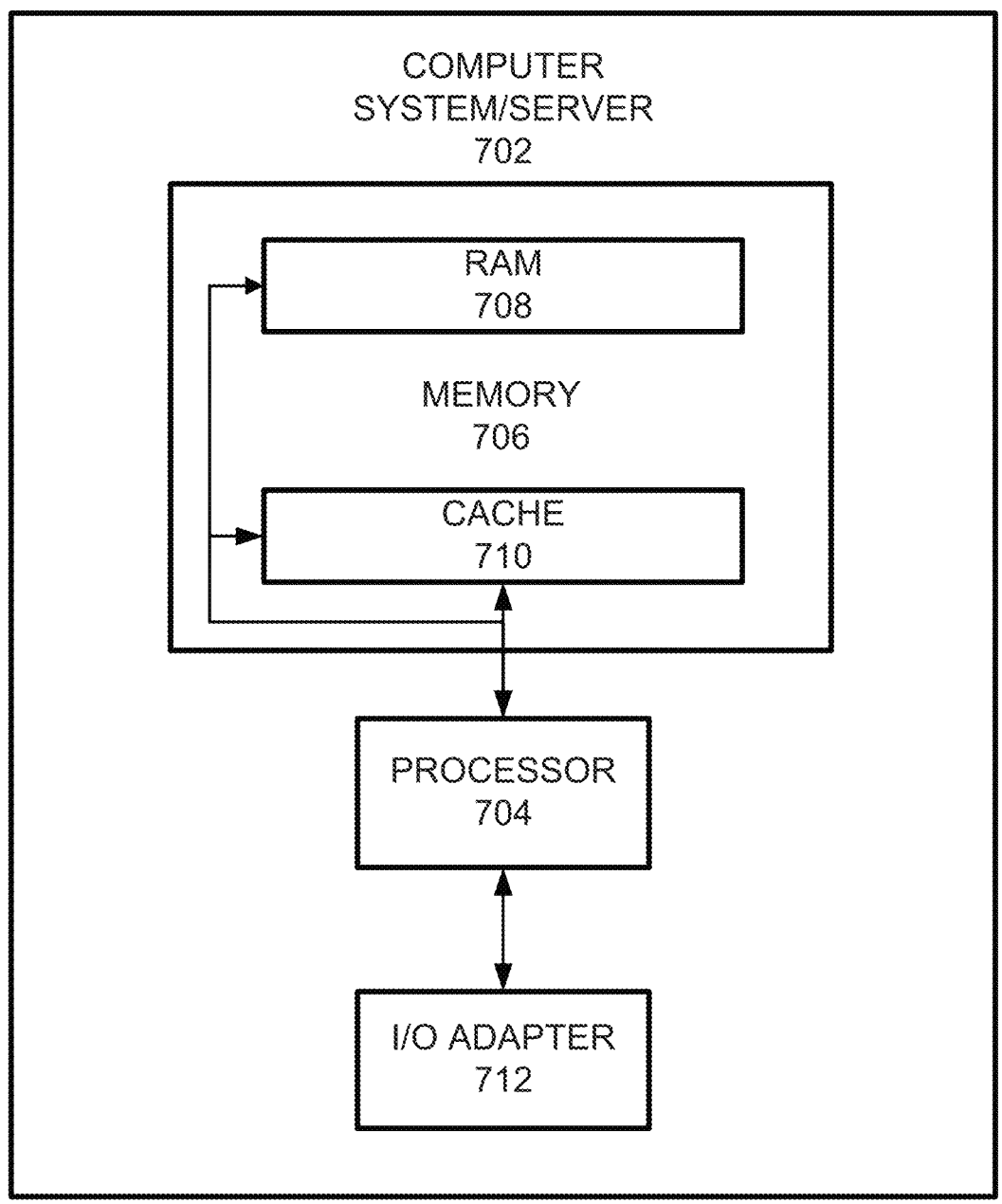
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O adapter 712, such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces of the adapter 712. Still yet, computer system/server 702 can communicate with one or more networks such as a local area network (LAN), a general wide area network (WAN), and/or a public network (e.g., the Internet) via a network adapter. As depicted, adapter 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
in response to identifying that a transport lacks sufficient priority to park at a parking space within a certain distance of a location hosting an event, maneuvering the transport to a drop-off area proximate to the location to drop off an occupant and assigning an initial parking space to the transport, wherein the initial parking space is located greater than the certain distance from the location;
maneuvering the transport to the initial parking space;
at a time before completion of the event, determining whether the parking space within the certain distance is available, wherein when the parking space is available, the method comprises:
maneuvering the transport to the parking space to park, and
in response to the completion of the event, maneuvering the transport to a location of a mobile device associated with the occupant.

2. The method of claim 1, comprising:
identifying the completion of the event based on receiving a command from the mobile device to leave the parking space.

3. The method of claim 1, wherein when the parking space is not available, the method comprises:
remaining in the initial parking space; and
in response to identifying the completion of the event, maneuvering the transport to the location of the mobile device.

4. The method of claim 1, comprising:
notifying the mobile device of a location of the initial parking space and the parking space.

5. The method of claim 1, wherein the maneuvering the transport to the parking space further comprises:
maneuvering the transport to the parking space based on the parking space being identified as available and the transport having been parked in the initial parking space for a certain time.

6. The method of claim 5, wherein the maneuvering of the transport to the parking space further comprises:
automatically maneuvering the transport to the parking space after the certain time.

7. The method of claim 1,:
identifying the completion of the event by detecting that the mobile device has moved a certain distance from the location.

8. A system, comprising:
a processor that, when executing instructions stored in a memory, is configured to:
in response to it being identified that a transport lacks sufficient priority to park at a parking space within a certain distance of a location hosting an event, maneuver the transport to a drop-off area proximate to the location to drop off an occupant and assign an initial parking space to the transport, wherein the initial parking space is located greater than the certain distance from the location;
maneuver the transport to the initial parking space;
at a time before completion of the event, determine whether the parking space within the certain distance is available, wherein when the parking space is available, the processor is further configured to:
maneuver the transport to the parking space to park, and
in response to the completion of the event, maneuver the transport to a location of a mobile device associated with the occupant.

9. The system of claim 8, wherein the processor is configured to:
identify the completion of the event based on receiving a command from the mobile device to leave the parking space.

10. The system of claim 8, wherein when the parking space is not available, the processor is configured to:
remain in the initial parking space; and
in response to the completion of the event, maneuver the transport to the location of the mobile device
move to the location of the device associated with the at least one occupant.

11. The system of claim 8, wherein the processor is configured to:
notify the mobile device of a location of the initial parking space and the parking space.

12. The system of claim 8, wherein when the processor maneuvers the transport to the parking space, the processor is further configured to:
maneuver the transport to the parking space based on the parking space being identified as available and the transport having been parked in the initial parking space for a certain time.

13. The system of claim 12, wherein when the processor maneuvers the transport to the parking space, the processor is further configured to:
automatically maneuver the transport to the parking space after the certain time.

14. The system of claim 12, wherein the processor is configured:

identify the completion of the event based on a detection that the mobile device has moved a certain distance from the location.

15. A non-transitory computer-readable storage medium comprising instructions that, when executed by a processor, cause a processor to perform:
    in response to identifying that a transport lacks sufficient priority to park at a parking space within a certain distance of a location hosting an event, maneuvering the transport to a drop-off area proximate to the location to drop off an occupant and assigning an initial parking space to the transport, wherein the initial parking space is located greater than the certain distance from the location;
    maneuvering the transport to the initial parking space;
    at a time before completion of the event, determining whether the parking space within the certain distance is available, wherein when the parking space is available, the method comprises:
        maneuvering the transport to the parking space to park, and
    in response to the completion of the event, maneuvering the transport to a location of a mobile device associated with the occupant.

16. The non-transitory computer-readable storage medium of claim 15, wherein the instructions cause the processor to perform:
    identifying the completion of the event based on receiving a command from the mobile device to leave the parking space.

17. The non-transitory computer-readable storage medium of claim 15, wherein when the parking space is not available, the instructions further cause the processor to perform:
    remaining in the initial parking space; and
    in response to identifying the completion of the event, maneuvering the transport to the location of the mobile device.

18. The non-transitory computer-readable storage medium of claim 15, wherein the instructions cause the processor to perform:
    notifying the mobile device of a location of the initial parking space and the parking space.

19. The non-transitory computer-readable storage medium of claim 18, wherein the instructions cause the processor to perform:
    maneuvering the transport to the parking space based on the parking space being identified as available and the transport having been parked in the initial parking space for a certain time.

20. The non-transitory computer-readable storage medium of claim 18, wherein the instructions cause the processor to perform:
    identifying the completion of the event by detecting that the mobile device has moved a certain distance from the location.

* * * * *